United States Patent
Pavageau et al.

(10) Patent No.: US 10,122,105 B2
(45) Date of Patent: Nov. 6, 2018

(54) SECURED BODY OF MEMORY CARD READER

(71) Applicant: INGENICO GROUP, Paris (FR)

(72) Inventors: Stephane Pavageau, La Roche de Glun (FR); Johann Jadeau, Bourg-les-Valence (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/609,690

(22) Filed: May 31, 2017

(65) Prior Publication Data

US 2017/0346208 A1 Nov. 30, 2017

(30) Foreign Application Priority Data

May 31, 2016 (FR) ..................... 16 54938

(51) Int. Cl.
*H01R 12/72* (2011.01)
*H01R 13/66* (2006.01)
*H01R 13/508* (2006.01)
*G06K 7/00* (2006.01)

(52) U.S. Cl.
CPC ......... *H01R 12/721* (2013.01); *H01R 13/508* (2013.01); *H01R 13/6666* (2013.01); *G06K 7/0056* (2013.01)

(58) Field of Classification Search
CPC .............. H01R 13/665; H01R 13/6683; G06K 7/0078; G06K 7/0021; G06K 7/0026; G06K 7/003; G06K 7/0034; G06K 7/0039; G06K 7/0043; G06K 7/0047; G06K 7/0052; G06K 7/0056; G06K 7/006; G06K 7/0065; G06K 7/0069; G06K 7/0073; G06K 7/0082; G06K 7/0086; G06K 7/0091

See application file for complete search history.

(56) References Cited

U.S. PATENT DOCUMENTS

2015/0295400 A1  10/2015  Pavageau

FOREIGN PATENT DOCUMENTS

| EP | 2793537 A1 | 10/2014 |
| FR | 2992094 A1 | 12/2013 |
| FR | 2997530 A1 | 5/2014 |

OTHER PUBLICATIONS

French Search Report dated Feb. 2, 2017 for corresponding French Application No. 1654938, filed May 31, 2016.
English translation of the French Written Opinion dated Feb. 2, 2017 for corresponding French Application No. 1654938, filed May 31, 2016.

*Primary Examiner* — Ross Gushi
(74) *Attorney, Agent, or Firm* — David D. Brush; Westman, Champlin & Koehler, P.A.

(57) ABSTRACT

A memory card reader body has a generally rectangular parallelepiped shape and a slot for inserting a memory card. The reader body furthermore includes a housing for receiving a memory card connector, and at least one protection circuit. The body includes an upper lid and a lower lid, where the protection circuit is positioned on an internal face of the upper lid.

11 Claims, 6 Drawing Sheets

SECURED BODY OF MEMORY CARD READER

1. CROSS-REFERENCE TO RELATED APPLICATIONS

Figure 1:
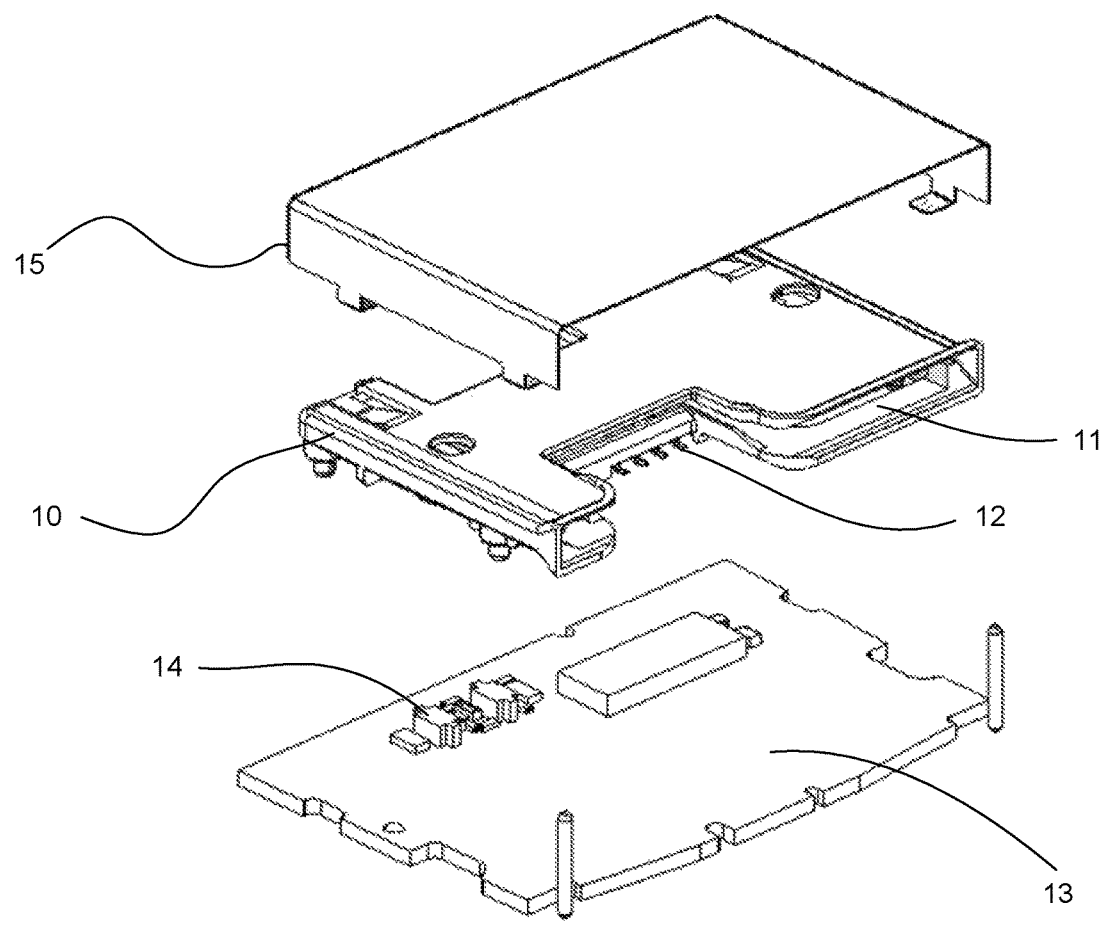

This application claims priority to and the benefit of French Patent Application No. FR1654938, filed May 31, 2016, the content of which is incorporated herein by reference in its entirety.

2. FIELD OF THE DISCLOSURE

The disclosure is situated in the field of memory card readers. The disclosure relates more particularly to a memory card reader that is to be mounted in a memory card reader terminal. Such a terminal can be for example a payment terminal, or an identification terminal. More generally, the disclosure relates to any type of terminal that can include a memory card reader.

3. PRIOR ART

Memory card reader terminals comprise, in addition to a memory card reader, a number of components such as a keypad, a screen, one or more processors, memory and an electrical power source. For many years now, memory card reader terminals have seen a great increase in the number of their functions. This is especially true for payment terminals. In addition to the payment function, these terminals have embedded functions for carrying out network communications, detecting contactless memory cards, managing coupons (for example loyalty coupons) etc.

In addition to the great increase in these ancillary functions, memory card reader terminals must also be resistant to various attacks or attempts at fraud to which they are frequently subjected. In order to obtain homogeneous resistance by terminals to attacks, international standards have been laid down in the field of payment. For example, the PCI PED (Payment Card Industry—Pin Entry Device) standard has laid down requirements in terms of intrusion and the detection of attempts to hack terminals. This is not the only standard in force.

However, because of these standards, terminals that previously had low-level protection are being gradually replaced by increasingly secured terminals. Among the different aspects of securing terminals, it is more particularly the protection of the memory card reader that industrialists in this sector are concerned with. The memory card reader indeed remains a weak link of the memory card reader terminal. This is because the memory card reader comprises a slot for inserting a memory card, and this slot makes the interior of the terminal accessible from the exterior. In particular, attackers seek to obtain access to the memory card connector. The memory card connector is the part of the memory card reader that comes into contact with the chip or the microprocessor embedded in the memory card. When an attacker manages to access this memory card connector without being spotted, then he can intercept and read data exchanged between the chip or the microprocessor of the card and the processor of the memory card reader terminal. Among the pieces of data intercepted, we can cite especially the secret code entered by the customer when this secret code is requested. With certain smart cards, this code can be conveyed without encryption.

This explains why much effort has been made to secure memory card readers. Thus, for example, memory card readers have been provided with lattice-based protection. This protection prevents any insertion made by drilling the terminal. When an object seeks to penetrate the protective enclosure, a short-circuit is produced causing the terminal to be put out of service.

Besides, modifications seeking to protect memory card connectors against electrostatic discharge or against wear and tear have also been proposed. For example, metal parts have been disposed at the entry of the memory card reader to provide mechanical guidance (preventing wear and tear) and/or to provide for the discharging of the card prior to its insertion into the memory card reader. These metal parts are commonly shaped as metal guiding rods with a height of a few millimeters. Another example consists in adding metal parts that take the form of a card-discharging comb.

All these modifications have resulted in great complexity of manufacture. Besides, the cost of manufacturing has also increased. At present, the requirements in terms of standards for security are such that, when manufacturing a reader terminal, it is necessary to envisage several steps bringing together, all at the same time, the staggered soldering of components, the need to have components resistant to reflow soldering, etc. In addition to the complexities of manufacturing the memory card reader terminal, these methods make the maintenance of the terminals produced highly complicated or even impossible, thus raising difficulties for the maintenance service providers as well as for the manufacturers of memory card reader terminals.

Referring to FIG. 1, a classic assembly of a memory card reader is described. This memory card reader comprises a memory card reader body 10, comprising a memory card insertion slot 11. The memory card connector is directly integrated into the memory card reader. It comprises pins 12 for connection to the printed circuit board (PCB) 13 (seen in a partial view). The PCB 13 also includes electronic components 14. To protect the memory card reader 10, it is covered with a full protection element 15 as well as a front protection element.

There is therefore a need to provide a memory card reader architecture that is intrinsically secured and does not require any additional protection. Such an architecture has been disclosed in the patent application FR2997530 published on 2 May 2014. This patent application more particularly describes a memory card reader body with an overall rectangular parallelepiped shape comprising a slot for inserting a memory card. Such a reader body comprises, on a rear face, a housing for receiving a memory card connector, this housing for receiving having a pre-determined volume shape and comprising a conductive track that takes the form of a lattice. This lattice is more particularly made with what is called the LDS (Laser Direct Structuring) technique. However, this technique has drawbacks, especially in industrial-scale production and in terms of costs: indeed, plotting a track by MID (Molded Interconnected Device) on an existing plastic element with complex shapes and volumes is difficult because it is difficult to access certain zones by laser. This especially lengthens the time needed to create the part and increases costs.

4. SUMMARY

An exemplary embodiment of the present disclosure relates to a memory card reader body, such a body comprising, as here above, on its rear face, a housing for receiving a memory card connector, said housing for receiving having a pre-determined volume shape and comprising at least one protection circuit.

Such a memory card reader body can however be distinguished from known reader bodies by the fact it comprises two distinct parts: an upper protective lid, said upper lid comprising, on its inner face, said at least one protection circuit; and a lower lid comprising the housing for receiving a memory card connector.

More particularly, an exemplary embodiment discloses a memory card reader body having a general rectangular parallelepiped shape comprising a slot for inserting a memory card, the reader body furthermore comprising a housing for receiving a memory card connector, and at least one protection circuit, characterized in that it comprises an upper lid and a lower lid, said protection circuit being positioned on the internal face of the upper lid.

Thus, since the memory card reader body is constituted by two parts, it is easier to plot the conductive track or tracks on the internal face of the upper lid, these conductive tracks providing for the security of the reader when it is mounted. Thus, an exemplary embodiment of the disclosure facilitates mounting, while at the same time extending the protection lattices. Indeed, through the configuration of the memory card reader body in two distinct parts, an exemplary embodiment enables firstly the soldering of the memory card connector to the PCB and then the affixing of the two parts of the memory card reader body to the PCB in covering the memory card connector.

According to one particular characteristic, the protection circuit extends appreciably throughout the surface of the internal face of the upper lid.

According to one particular characteristic, said protection circuit takes the form of at least one lattice and the etching density of the protection circuit is variable according to the location of the protection circuit.

According to one particular characteristic, the upper lid has a generally rectangular parallelepiped shape comprising a main surface, two side walls and one longitudinal wall, the side walls and the longitudinal wall being fixedly attached to the main surface by means of a cut-off edge, the cut-off edge comprising, at each of the side walls, at least one assembling aperture.

According to one particular characteristic, the lower lid has a generally rectangular parallelepiped shape comprising a main surface, two side walls and one longitudinal wall and comprises, at each side wall, at one least fastening lug that is positioned so as to be facing a corresponding aperture of the upper lid.

According to one particular embodiment, the lower lid is shaped so as to fit closely with the upper lid, each fastening lug of the lower lid taking position in a corresponding assembling aperture of the upper lid, the unit formed by the upper lid and the lower lid being held by the insertion, into each assembling aperture, of a locking pin.

According to one particular characteristic, the lower lid comprises at least one card-braking device.

According to one particular characteristic, the lower lid comprises at least one electrostatic discharge zone.

According to one particular characteristic, said protection circuit is made by a laser-etching technique.

According to one particular characteristic, the upper lid comprises at least one brittle zone configured to be broken at any unauthorized extraction of said upper lid.

According to one particular embodiment, said protection circuit takes the form of at least one lattice comprising at least one conductive track.

According to one particular embodiment, said protection circuit takes the form of at least one continuous electrical track.

For example, this track can be obtained through the technique known as the MID (Molded Interconnected Device) technique or by other methods.

This laser-etching technique is coupled with chemical baths and is called Laser Direct Structuring or LDS.

According to one particular characteristic, said protection circuit is a flexible printed circuit board positioned within said housing for receiving.

According to one particular characteristic, said rear face of said memory card reader comprises at least one complementary housing for receiving at least one electronic component and said complementary housing is positioned beneath said protection circuit.

According to one particular characteristic, said at least one protection circuit is shaped to define electrostatic discharge zones that come into contact with a smart card when said smart card is introduced into said reader body.

The disclosure also relates to a memory card reader terminal. According to the an exemplary embodiment, such a terminal comprises a memory card reader body as described here above.

5. FIGURES

Figure 2:
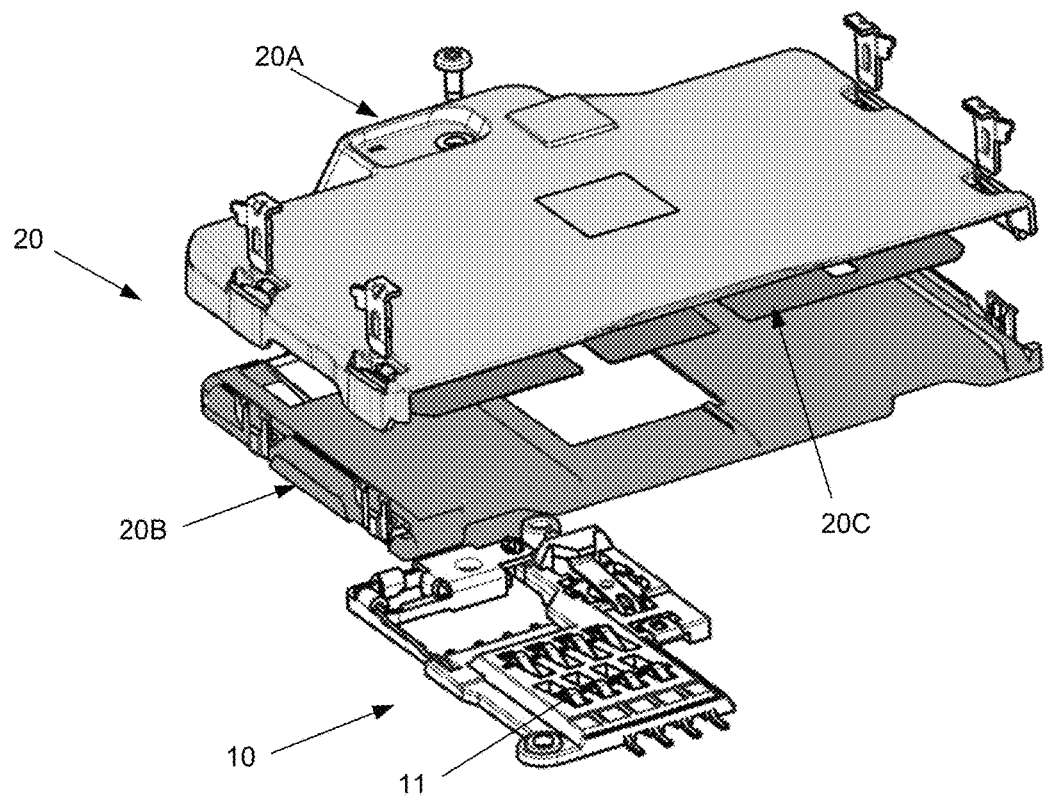
Figure 3:
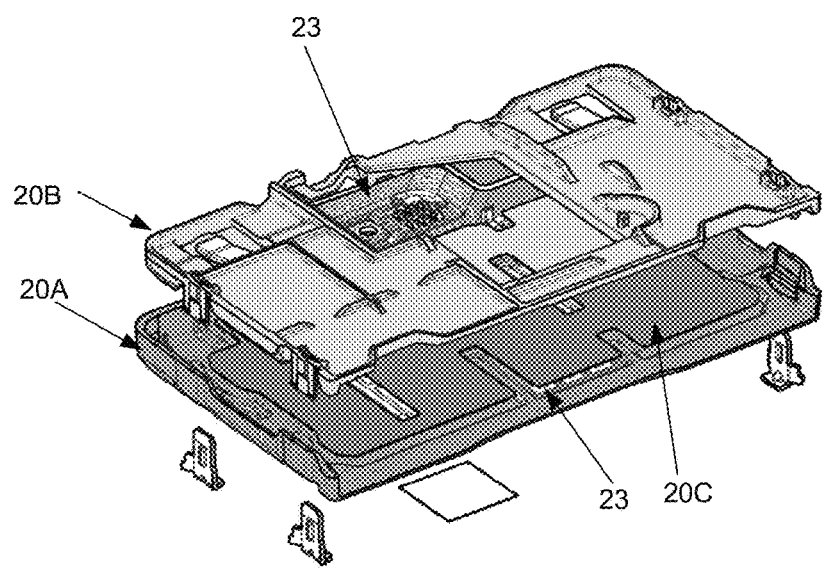
Figure 3B:
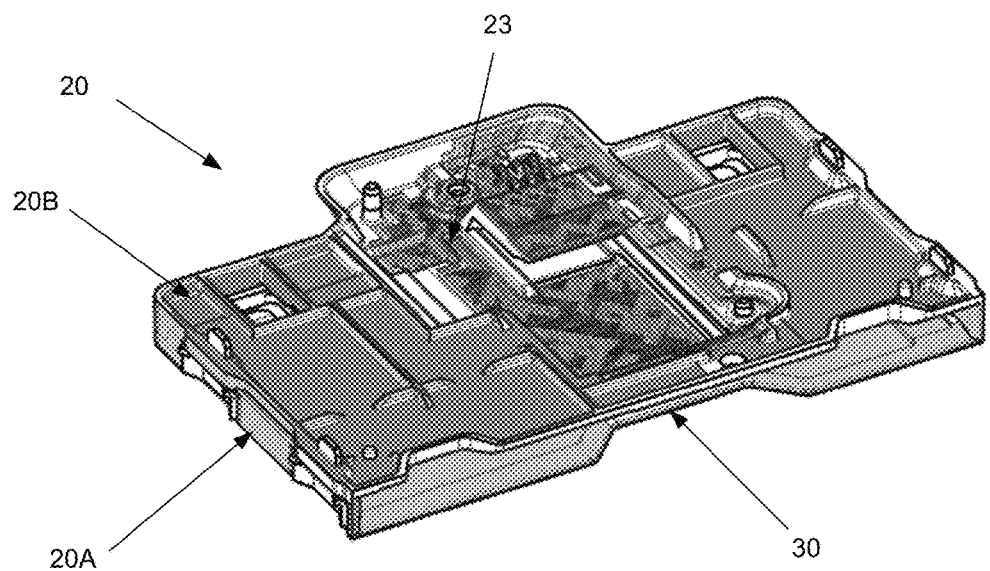
Figure 4:
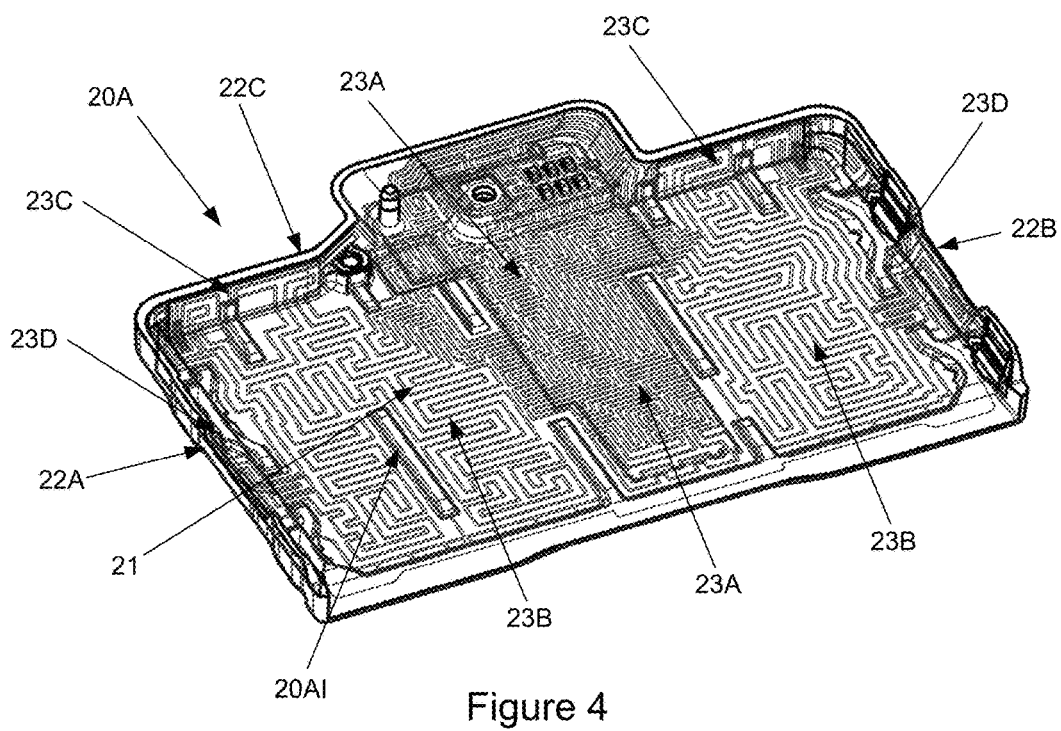
Figure 5:
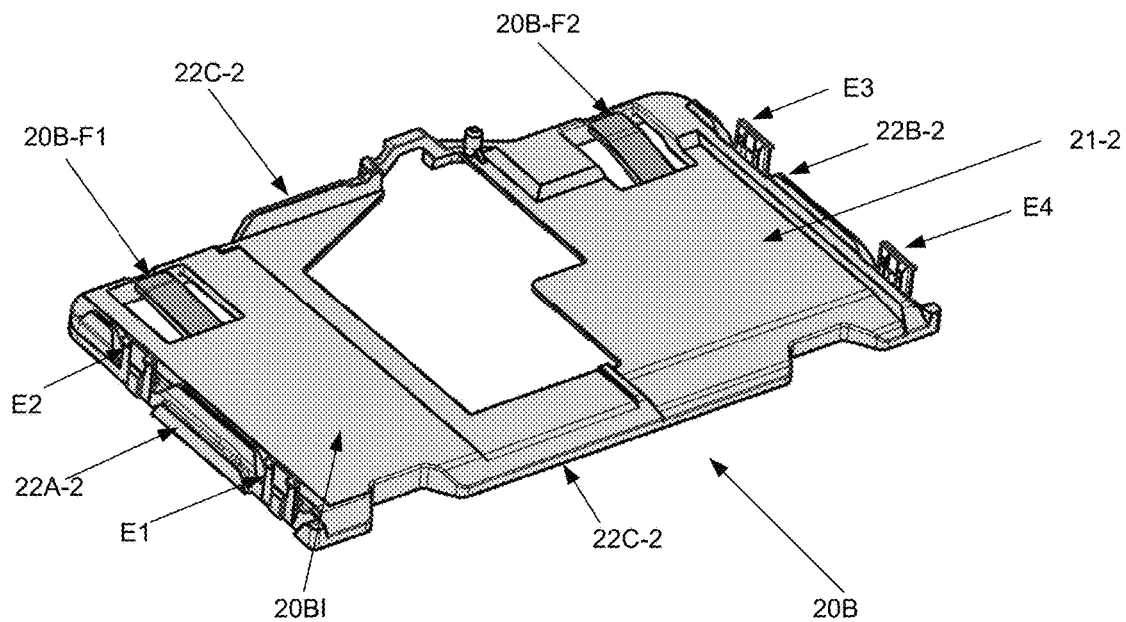
Figure 6:
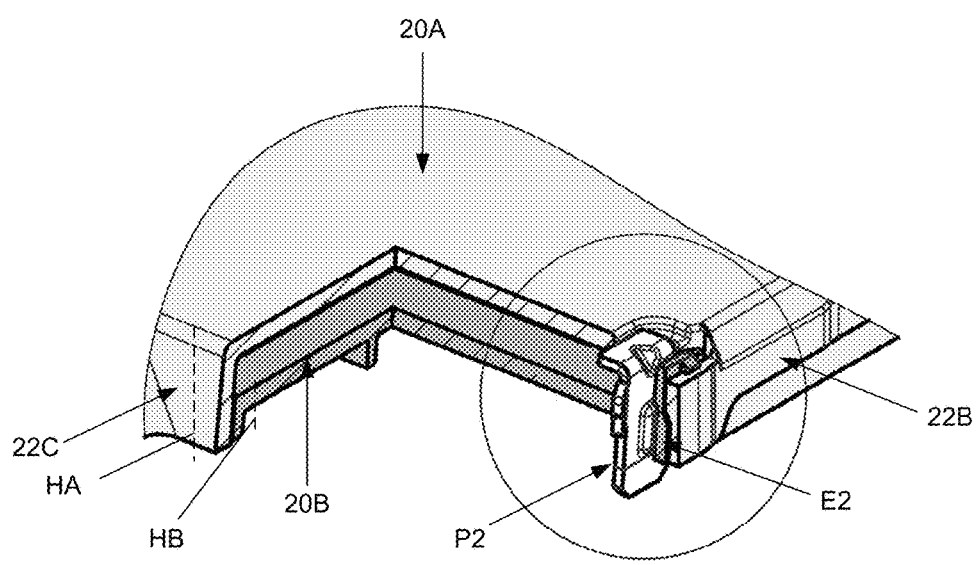
Figure 7:
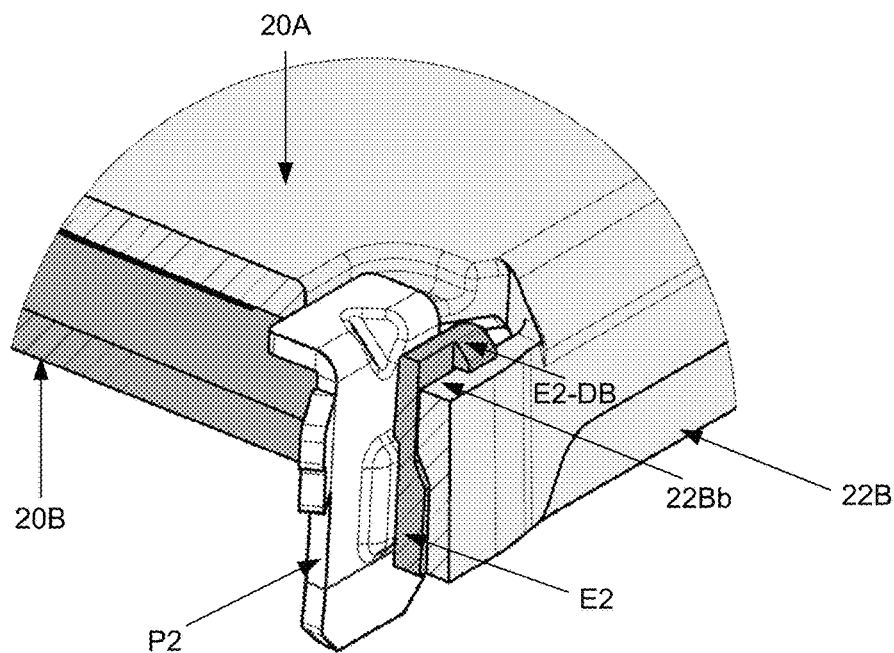
Figure 8:
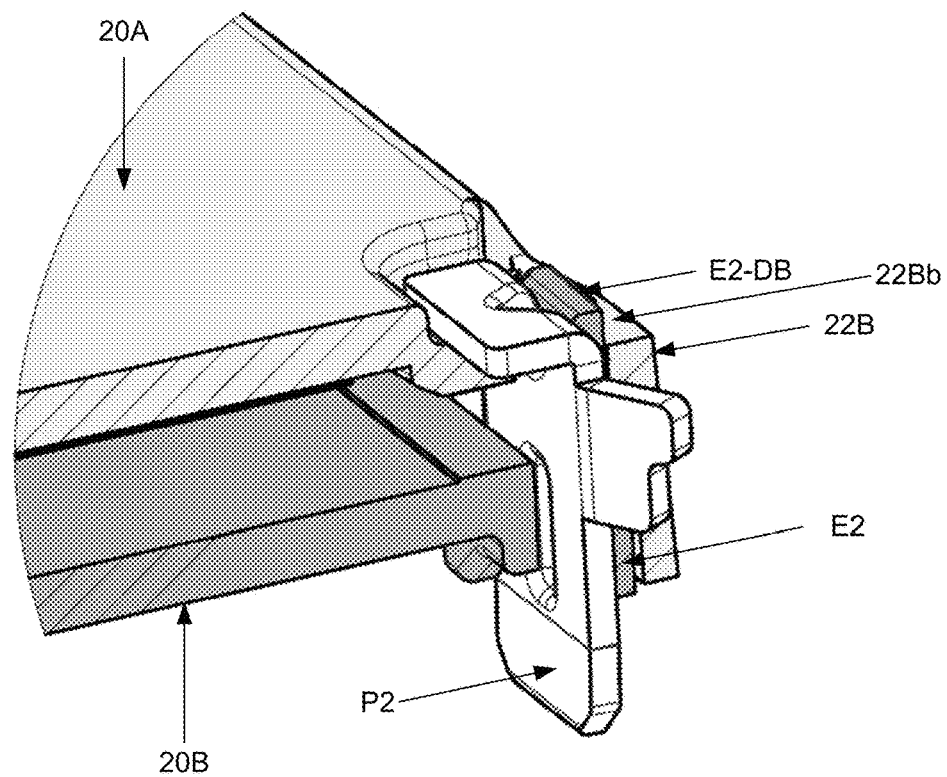
Figure 10:
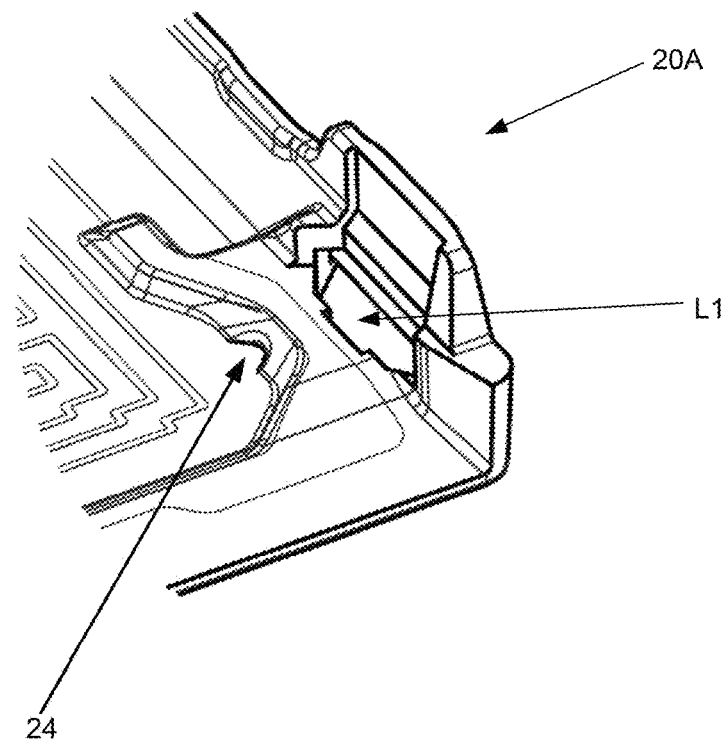
Figure 9:
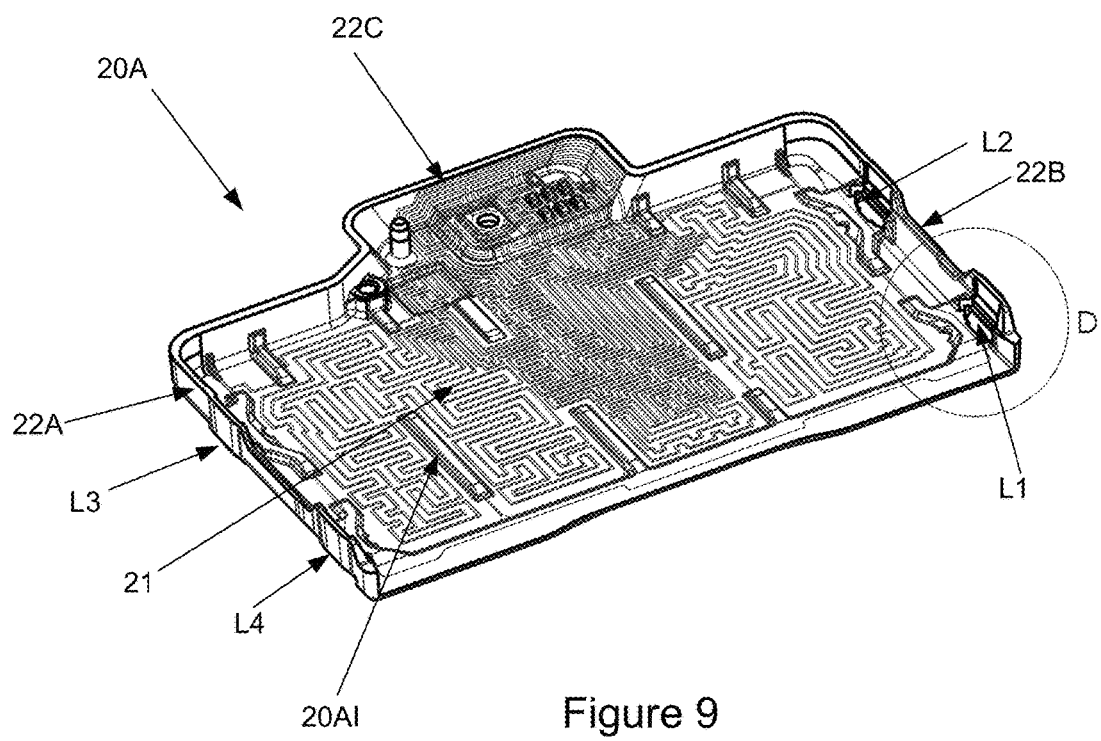

Other features and advantages of one or more embodiments of the disclosure shall appear more clearly from the following description of a preferred embodiment given by way of a simple illustrative and non-exhaustive example and from the appended drawings, of which:

FIG. 1 already presented describes the classic architecture of a memory card reader;

FIG. 2 illustrates the general principle of an exemplary embodiment of the disclosure, namely the separation of the reader body into two distinct functional units;

FIG. 3 also illustrates the general principle of an exemplary embodiment in separating the reader body into two distinct parts;

FIG. 3b represents the body of the reader according to one embodiment;

FIG. 4 presents the internal surface of the upper lid which contains a protection lattice with two different densities;

FIG. 5 presents the internal surface of the lower lid according to one embodiment in which the card brakes can be seen;

FIGS. 6, 7 and 8 illustrate the assembly and affixing of the memory card reader body according to one embodiment;

FIG. 9 presents the internal surface of the upper lid according to one embodiment;

FIG. 10 (detailed view D) shows a detail, at a weak point of the upper lid, of a feature that prevents the reader from being opened without activation of the security systems.

6. DETAILED DESCRIPTION 6.1. Reminder of an Exemplary Principle of the Disclosure An exemplary principle of the disclosure proposes a memory card reader architecture that directly integrates the functional constraints inherent in the working of this type of device. More particularly, an exemplary principle of the disclosure includes in subdividing the memory card reader into two distinct parts. There is a first part through which the memory card signals travel in transit, this part including the switch for detecting the presence of cards. This part also ensures a part of the electrostatic discharge. This first part corresponds to the memory card connector. A second part enables the insertion of the memory card. This part firstly ensures the guidance and the absorption of forces of the memory card. Secondly, it carries out a part of the electronic discharge from the card, and also protects the signals exchanged between the memory card and the memory card connector. This second part forms the body of the memory card reader. According to an exemplary embodiment, the body of the memory card reader is itself divided into two distinct parts that closely fit into each other to form a complete memory card reader: the body comprises an upper protection lid and a lower lid. On its internal face, the upper protection lid comprises one or more protection circuits that extend on a significant portion of the surface.

An exemplary principle of the disclosure is described with reference to FIGS. 2 and 3. According to an exemplary embodiment, a memory card connector 10 is built independently of a memory card reader body 20. The memory card connector 10 is designed to read the signals from the memory card (not shown). In FIG. 2, the memory card connector 10 is designed for the reading of a smart card. To this end, the memory card connector 10 comprises a certain number of pins 11 (eight in FIG. 3) enabling contact to be made with corresponding zones of the memory card (six or eight zones depending on the memory card). The pins 11 are generally metal spring blades that get positioned on the surface of the chip. Since the object of the disclosure is not this connector, it shall not be described further below.

This memory card connector 10 is independent of the body of the memory card reader 20. This means that the memory card connector 10 is not assembled with the body of the memory card reader 20 before being assembled with the PCB of the reader terminal. Thus, first the memory card connector 10 is affixed to the PCB and then the body of the memory card reader 20 is affixed above the connector 10.

According to an exemplary embodiment, the body of the memory card reader 20 comprises an upper protective lid 20A, said upper lid 20A comprising, on its internal face, at least one protection circuit 23; and a lower lid 20B comprising the housing for receiving the memory card connector 10.

Ingeniously, the conductive track or tracks 20 are made prior to the assembling of the body of the memory card reader. More specifically, subsequently to the molding of the upper protection lid 20A, one or more conductive tracks are made. For example the conductive track or tracks take the form of at least one protection circuit 23. This protection circuit 23 can be a three-dimensional circuit. This protection circuit 23 takes the form for example of one or more lattices for the detection of intrusion or it takes the form of one or more continuous tracks for detecting intrusion (for example a ground circuit and two lattices having different potentials). Unlike in the prior art, this protection circuit or circuits 23 are positioned on the entire internal face of the upper lid 20A. The protection circuit or circuits can take several forms, for example an etching, a glued-on copper track or again a flexible printed circuit board. This approach has at least two advantages. The first advantage lies in the protected surface. Indeed, with the prior art solutions, only the surface located above the memory card connector had a protection track. The result of this is that a major part of this surface had no protection. This could potentially pose a problem of security. With the solution provided by the inventors, it is possible to protect a far more extensive surface. This means that the security provided by the memory card reader body is greater.

Advantageously, in addition to the internal face of the upper lid 20A, the internal side faces of the upper lid 20A are also provided with an additional protection circuit. This additional protection circuit prevents any attempt at intrusion that would be made through a side of the reader body. The operating mode for fraudulent insertion would be appreciably the same as the one described earlier, except that the drilling would done by the side of the reader body. This case is relatively theoretical since drilling by the side in this way is an operation requiring very major technical resources that are generally not within the reach of fraudulent individuals.

According to one specific embodiment, the memory card reader body 20 also comprises a protective sheet 20C.

According to the present technique, the upper lid 20A of the body of the memory card reader 20 in one particular embodiment is a part known as a molded interconnect device (MID). More particularly, the MID upper lid 20A makes it possible to protect two surfaces in opposite parts. Indeed, a laser etching is done in order to produce three-dimensional electronic tracks.

In one embodiment, the part made by LDS (Laser Direct Structuring) has an internal surface adapted, on the one hand, to the shape of the connector 10 and, on the other hand, to the minimum distance necessary for the passage of the smart card, thus enabling complete MID protection in all directions. MID etching can be used to make one or more lattices, said lattice or lattices being classically a protection that makes it possible to detect the insertion of a device into the body of the memory card reader. The use of a lattice to detect an insertion or an attempted drilling is a known technique in the field of the present disclosure. However, unlike in the prior art, an exemplary embodiment of the present disclosure directly integrates the lattice into the internal surface of the memory card connector in a highly integrated manner and on the entire surface (or on a significant part of the surface) of the upper lid 20 of the body of the memory card reader 20.

Unlike in the prior art however, it is not necessary to carry out laser etching by using a complex etching technique. Indeed, this etching is done in all three dimensions in order to shape the volume of the memory card connector, but directly on the internal face of the upper lid. The process of defining the protection circuit is thus made considerably easier. At the same time, the degree of protection offered ultimately by the body of the memory card reader is not thereby reduced. On the contrary, by extending the protection circuit to the entire internal surface of the upper lid, the protection offered is improved.

In addition, the extended protection zone does not need to be as fine as the direct protection (the protection above the direct signals). This significantly augments the level of protection of the upper lid for a lower cost.

Here below, we describe a specific embodiment of the disclosure. It is understood that this embodiment in no way limits the scope of the disclosure or of the appended claims. For example, in other embodiments, the memory card connector can be protected by using means of etching electrical tracks other than those described here below (for example a flexible circuit glued to the interior of the body of the reader).

6.2. Detailed Description of One Embodiment

In this embodiment of the disclosure, an internal protection circuit (for example a protection lattice) is positioned in the upper lid of the body of the memory card reader. In this embodiment, the protection circuit takes the form of electrical tracks integrated into the internal face of the upper lid 20A of the body of the memory card reader 20. Unlike in the prior art, the surface covered by the circuit is appreciably greater and secures the body of the reader more efficiently. As explained here above, the MID and LDS technologies are for example implemented without ruling out the use of other techniques that might be more appropriate.

This embodiment is presented more particularly with reference to FIGS. 3b to 10. This embodiment comprises characteristics not described here above. However, identical numerical references are used for the elements already described in FIGS. 2 and 3.

In this embodiment, the body of the memory card reader 20 is a part having a generally rectangular parallelepiped shape, with a width of about 60 millimeters, a depth of about 40 millimeters and a height of about four millimeters. The body of the memory card reader 20 comprises an insertion slot 30, with a height of 0.8 millimeters to 1.5 millimeters. The insertion slot 30 enables the insertion of the memory card in an accurate position so that it comes into contact with the memory card connector 10. The memory card reader also has, on its rear face 21, a housing 22 for receiving and covering the memory card connector 10. The volume shape of this housing 22 for receiving is appreciably complementary to the volume shape of the memory card connector 10, with of course sufficient space for the presence of the memory card as well as other electronic components.

In this embodiment, two densities of lattice are used. More particularly, as described in FIG. 4, a "high density" zone (23A) corresponds to immediate protection (against direct drilling above the connector to access the sensitive signals). A "lower density" zone (23B) corresponds to protection against indirect attacks (drilling, then insertion of objects slantwise to access sensitive signals as described here above). Such a solution is advantageous because it reduces the cost of manufacturing the part without however impairing security. As indicated here above, the protection lattice of lower density can also extend on the side wall and longitudinal walls (23C, 23D) of the internal face of the upper lid (20A).

In this embodiment, the protection circuit 23 placed or etched on the internal face of the upper lid 20A is covered with a protection sheet 20C. This protection sheet 20C has the function of protecting the protection circuit 23 from any contact and against any deterioration caused by a memory card. Indeed, an accessory problem that can arise with the solution of the disclosure originates in the possible insertions of fraudulent objects through the card insertion slot 30. Now, should such an object damage the protection circuit, that could give rise to at least two problems: a deterioration of the protection circuit and therefore the untimely triggering of the corresponding protection (for example the terminal is put out of action) and/or an electrostatic discharge of the card directly into the protection circuit (leading to the same result).

In this embodiment, relatively brittle zones facing fastening pins prevent ill-intentioned individuals, if any, from opening the reader without breaking the upper lid, around which active signals are plotted. One of these brittle zones (24) is described with reference to FIG. 10 which shows a portion of the internal face of the upper lid 20A.

In this embodiment, the lower lid 20B of the body of the connector has the main function of guiding the card when it is inserted into the memory card reader. In addition, ingeniously and again unlike in the prior art, the lower lid 20B in at least variant comprises one or more of the following characteristics:

it integrates card-braking devices (preventing impacts on the card stops; such card-braking devices are presented by way of examples on the lower lid illustrated in FIG. 5 (20B-F1, 20B-F2): the card-braking devices are constituted, in this embodiment, by two plastic strips; each of these strips forms a pre-determined angle relative to the (plane) surface for guiding the memory card; depending on the embodiments, the angle of tilt of one strip can be different from the angle of tilt of the other strip. In this embodiment, the brakes are positioned on each side of the lid. Other modes of positioning can of course be envisaged;

it is made out of a dissipative material, thus limiting the effects of electrostatic discharges on a terminal while preventing the dissipative part from shorting the protection circuits of the upper lid 20A. This characteristic of electrostatic discharging can be coupled with the preceding characteristic: the strips having different tilts can stop the card on the one hand and discharge its static electricity on the other hand, doing so in a gradual manner;

it is made out of transparent or translucent material to enable the slot to be lit up homogenously (for the reception of the card);

it has a protection circuit on its internal face in the same way as the upper lid 20A.

These complementary characteristics flow ingeniously from the use of a reader body made of two parts that can be fitted together. Indeed, such characteristics cannot be implemented with a reader body made out of only one part because the technical nature of these characteristics prevents that. Thus, for example, it would be highly complicated (and costly) to make a reader body that might include one transparent portion and one opaque portion.

In one embodiment, the upper lid 20A is fitted together with the lower lid 20B to form the body of the memory card reader. More specifically, the upper lid has a generally rectangular parallelepiped shape with a main surface (21), two side walls (22A, 22B) and a generally longitudinal wall (22C). The upper lid comprises an internal face (20AI) and an external face. The protection circuit is disposed on the internal face (20AI) of the upper lid 20A. It also comprises, in this embodiment, on each of the side walls, two apertures (L1, L2, L3, L4), the through axis of which is parallel to the plane defining each side wall (20A, 20B). More particularly, the side walls and the longitudinal wall are fixedly attached to the main surface by means of a cut-off edge. The cut-off edge comprises, at the side walls, at least one assembling aperture (L1, FIG. 10). These apertures, as shall be explained here below, are made to receive locking pins (P1, P2, P3, P4) and fastening lugs (E1, E2, E3, E4).

The lower lid 20B, like the upper lid 20A, has a generally rectangular parallelepiped shape. It also has a main surface (21-2) two side walls (22A-2, 22B-2) and two generally longitudinal walls (22C-2). The internal face (20BI) is the face in contact with the memory card when it is inserted into the terminal: this internal face is therefore generally smooth. The external face is the face in contact with the printed circuit board of the card reader. This external face is structured to receive in particular, electronic components that are soldered to the printed circuit board of the card reader and that are covered by the lower lid 20B, so that these components are thus provided with a certain degree of physical protection. Thus, the height of the side walls and longitudinal wall is adapted to the height of the electronic components which are positioned beneath the lower lid 20B.

As indicated here above, during the assembly, the upper lid is placed on the lower lid in order to form a unit block. For this assembly to be done simply and efficiently (especially in terms of centering, and mounting precision), the lower lid (20B) comprises, in this embodiment, four fastening lugs (E1, E2, E3, E4) that are positioned so that, at the time of assembly, they penetrate the corresponding apertures (L1, L2, L3, L4) of the upper lid 20A. This implies especially, as in the present case, that the surface of the lower lid is slightly smaller than that of the upper lid: the goal is to make the upper lid totally cover the lower lid and thus make it possible to have the fullest possible protective lattice. Beside each fastening lug, there is also an aperture present. The size of this aperture is slightly smaller than that of the corresponding aperture (L1, L2, L3, L4) of the upper lid 20A. This second aperture, which is facing the corresponding aperture of the upper lid 20A, is to receive the same locking pin as the one inserted into the upper lid, as explained here below.

FIGS. 6 to 8 provide a more precise description of the elements enabling the mounting of the body of the memory card reader 20 on a printed circuit board (PCB). More particularly, the upper lid 20A is fitted on to the lower lid 20B.

FIG. 6 is a view in section illustrating, in this embodiment, the way in which the upper lid 20A is fitted into the lower lid 20B; on the left-hand part of the figure, it can be seen that the height of the walls of the upper lid (HA) is adapted so as to cover all or part of the wall of the lower lid; the height of the wall of the upper lid (HA) is equal to the height of the wall of the lower lid (HB) to which a regulatory height is added on for the thickness of the memory card;

at the right-hand part of FIG. 6, it is also possible to distinguish the assembling of a fastening lug (E2) and a locking pin (P2); this assembly can be seen more clearly in FIGS. 7 and 8;

FIG. 7 is a view in section of a portion of the lower lid and of the upper lid at an aperture of these two lids: more particularly, the figure displays a locking pin (P2) which crosses the two apertures and which, by its shape, exerts pressure on the fastening lug (E2) so that it is pressed against the side wall (22B) of the upper lid (20A); this specific shape is a bulge in the locking pin; the pressure exerted positions a locking tooth (E2-DB) on an edge (22-Bb) of the wall of the upper lid;

this bulge is outside the path of passage of the card. Thus, its space requirement is minimal because it is beneath the fastening lug, and the card continues to be in friction with the plane surface;

advantageously, this bulge adds non-negligible stiffness to the locking pin, which is very useful for offering resistance to the different mechanical pressures exerted on a smart card reader;

FIG. 8 shows the same elements as those of FIG. 7 from a different angle of view.

During the final assembly, on the printed circuit board, the locking pins are soldered to the printed circuit board of the memory card reader. The 90° fold, on top of the locking pin, enables the entire assembly to be locked. Thus, even a connector that is being sheared by wear and tear cannot be opened.

This fold has also a function that provides security: if it is attempted to open the connector without unsoldering it, a zone of weakness (brittle zone 24, FIG. 10) facing this fold will demand increased precautions to avoid destroying the lattice.

The embodiment presented here above for the assembling and fixed attachment of the unit comprises characteristics that can be reversed and/or combined according to operational and technical constraints: it can for example be envisaged that, instead of the lower lid, it is the upper lid that will be provided with fastening lugs, or even that the fastening lugs will be distributed between the upper lid and the lower lid.

Besides, all the characteristics presented in this embodiment can of course be combined individually or in groups with a general principle described here above without departing from the disclosure or of the appended claims.

6.3. Complementary Characteristics

According to another characteristic, to avoid the problems related to the soldering of the protective lattice (to the internal face of the body of the memory card connector) to the PCB, the connection between these two elements is made by means of an elastomer connector, for example of the Zebra type (registered mark). Thus, it is not necessary to have a complex mechanism for soldering body of the memory card reader to the PCB: indeed, the fact that the connection is provided by means of an elastomer connector makes it easier to mount the assembly constituted by the memory card connector, the elastomer connector and the memory card reader body.

More generally, to facilitate the mounting, the following steps are applied:

a step for affixing the memory card connector to the PCB; this affixing can be done by screwing or by soldering or by gluing or by a combination of these methods; other affixing methods can also be used;

a step for placing the elastomer connector (when it is used). The positioning of the elastomer connector can advantageously be done in a zone that is left free for this purpose within the memory card connector;

a step for assembling the body of the memory card reader by positioning the upper lid on the lower lid and by inserting the locking pins to obtain unit reader body that can be immediately positioned;

a step for positioning and affixing the body of the memory card reader with a mode of affixing the body of the reader relatively to the PCB. In the case of a Zebra element, a screw holding a part of the memory card connector is an advantageous solution or again a fifth pin acting as a mechanical holding piece can be added.

Thus, only two or three steps are needed to assemble and fix the memory card reader to the PCB.

6.4. Description of One Embodiment of a Memory Card Reader

In this embodiment, the memory card reader comprises a memory card reader body, a memory card connector and an elastomer connector. The memory card connector has an architecture such that it includes a space left free for the positioning of the elastomer connector. Thus, during assembly, the memory card connector is first of all fixed to the PCB, and then the elastomer connector is inserted into the space. The body of the memory card reader is then positioned above the assembly formed by the memory card connector and the elastomer connector. As already mentioned, the body of the memory card connector includes a zone for discharging the card. The memory card connector is affixed by means of a screw and four locking pins. The screw is also used to provide permanent pressure over time. The screw is screwed into the memory card connector which is itself affixed to the PCB by soldering. The link is therefore direct. The locking pins have a special shape, adapted firstly to fulfill a function of guiding the memory card in the reader and secondly if need be, to provide for an electrostatic discharging of the edges of the inserted card.

In addition, in this system, the centering between the memory card connector and the body of the memory card reader enables the device to be positioned in a rigorously precise manner.

Indeed, in this embodiment, the memory card connector comprises at least two centering holes. The centering holes are configured in such a way that centering pads, integrated into the body of the memory card reader, can take position in these centering holes. Thus, in this embodiment, it is not possible to carry out an erroneous assembly of the memory card reader. More particularly, it is not possible to position the body of the memory card reader with an inaccurate angle relative to the connector.

An exemplary embodiment of the present technique partly resolves the problems posed by the prior art.

Although the present disclosure has been described with reference to one or more examples, workers skilled in the art will recognize that changes may be made in form and detail without departing from the scope of the disclosure and/or the appended claims.

The invention claimed is:

1. A memory card reader body comprising:
   a generally rectangular parallelepiped shape;
   a slot for inserting a memory card;
   a housing for receiving a memory card connector;
   at least one protection circuit; and
   an upper lid and a lower lid, said upper lid and said lower lid being two distinct parts that can be fitted with each other, said protection circuit being positioned on an internal face of the upper lid,
   wherein said protection circuit takes the form of at least one lattice and an etching density of the protection circuit is variable according to a location of the protection circuit.

2. The memory card reader body according to claim 1, wherein the internal face of the upper lid has a surface, and the protection circuit extends appreciably throughout the surface of the internal face of the upper lid.

3. The memory card reader body according to claim 1, wherein the upper lid has a generally rectangular parallelepiped shape comprising a main surface, two side walls and one longitudinal wall, the side walls and the longitudinal wall being fixedly attached to the main surface by a cut-off edge, the cut-off edge comprising, at each of the side walls, at least one assembling aperture.

4. The memory card reader body according to claim 3, wherein said protection circuit is a laser-etched protection circuit.

5. The memory card reader body according to claim 3, wherein said protection circuit is a flexible printed circuit board positioned within said housing.

6. The memory card reader body according to claim 1, wherein the lower lid has a generally rectangular parallelepiped shape comprising a main surface, two side walls and one longitudinal wall, and the reader body comprises, at each side wall, at least one fastening lug that is positioned so as to be facing a corresponding aperture of the upper lid.

7. The memory card reader body according to claim 6, wherein:
   the upper lid has a generally rectangular parallelepiped shape comprising a main surface, two side walls and one longitudinal wall, the side walls and the longitudinal wall being fixedly attached to the main surface by a cut-off edge, the cut-off edge comprising, at each of the side walls, at least one assembling aperture; and
   the lower lid is shaped so as to fit together with the upper lid, each fastening lug of the lower lid taking position in a corresponding assembling aperture of the upper lid, and wherein a unit formed by the upper lid and the lower lid is held by the insertion, into each assembling aperture, of a locking pin.

8. The memory card reader body according to claim 1, wherein the lower lid comprises at least one card-braking device.

9. The memory card reader body according to claim 1, wherein the lower lid comprises at least one electrostatic discharge zone.

10. The memory card reader body according to claim 1, wherein the upper lid comprises at least one brittle zone configured to be broken when there is an unauthorized extraction of said upper lid.

11. A memory card reader terminal comprising
   a memory card reader body, which comprises:
   a generally rectangular parallelepiped shape;
   a slot for inserting a memory card;
   a housing for receiving a memory card connector;
   at least one protection circuit; and
   an upper lid and a lower lid, said upper lid and said lower lid being two distinct parts that can be fitted with each other, said protection circuit being positioned on an internal face of the upper lid,
   wherein said protection circuit takes the form of at least one lattice and an etching density of the protection circuit is variable according to a location of the protection circuit.

* * * * *